US012737162B2

(12) United States Patent
Lingelbach et al.

(10) Patent No.: US 12,737,162 B2
(45) Date of Patent: Sep. 15, 2026

(54) USING GENERATIVE AI TO MAKE A NATURAL LANGUAGE INTERFACE

(71) Applicant: PagerDuty, Inc., San Francisco, CA (US)

(72) Inventors: Dylan Lingelbach, San Francisco, CA (US); Weiyu Max Li, San Francisco, CA (US); Justan Fee, San Francisco, CA (US); Ralph A Bird, San Francisco, CA (US); Gordon R. Towne, San Francisco, CA (US); Nate M. Meierpolys, San Francisco, CA (US)

(73) Assignee: PagerDuty, Inc., San Francisco, CA (US)

( * ) Notice: Subject to any disclaimer, the term of this patent is extended or adjusted under 35 U.S.C. 154(b) by 144 days.

(21) Appl. No.: 18/428,909

(22) Filed: Jan. 31, 2024

(65) Prior Publication Data

US 2025/0244975 A1 Jul. 31, 2025

(51) Int. Cl.
*G06F 8/38* (2018.01)
*G06F 40/20* (2020.01)

(52) U.S. Cl.
CPC ................ *G06F 8/38* (2013.01); *G06F 40/20* (2020.01)

(58) Field of Classification Search
CPC .................................. G06F 8/38; G06F 40/20
See application file for complete search history.

(56) References Cited

U.S. PATENT DOCUMENTS

| | | | | |
|---|---|---|---|---|
| 5,978,594 | A * | 11/1999 | Bonnell | G06F 9/50 710/5 |
| 8,639,497 | B2 * | 1/2014 | Eggebraaten | G06F 40/40 704/9 |
| 10,938,678 | B2 * | 3/2021 | Ghosh | G06F 40/295 |
| 11,056,107 | B2 * | 7/2021 | Nahamoo | G10L 15/22 |
| 11,562,267 | B2 * | 1/2023 | Polleri | G06F 16/243 |
| 2023/0140918 | A1 * | 5/2023 | Saxena | G06Q 10/0635 705/7.27 |
| 2025/0244975 | A1 * | 7/2025 | Lingelbach | G06F 8/38 |

* cited by examiner

*Primary Examiner* — Wei Y Mui
*Assistant Examiner* — Amir Soltanzadeh
(74) *Attorney, Agent, or Firm* — Shumaker & Sieffert, P.A.

(57) ABSTRACT

An operations computing system receives, from a user computing device, initial natural language text input associated with an incident and generates, based on the initial natural language text input, a set of prompts. The operations computing system provides the set of prompts as input to a machine learning model and receives, from the model, text output for each prompt, in which the text output includes a clarifying question or a clarifying instruction. The operations computing system sends, to the user computing device, the text output, and receives, from the user computing device, additional natural language text input. The operations computing system applies the model to the natural language text input to generate respective initial structured text data for each prompt. The operations computing system applies the model to the respective initial structured text data for each prompt to generate updated structured text data including instructions for creating an incident workflow.

20 Claims, 8 Drawing Sheets

460

464

Incident Workflows

+ New Workflow

462

| Workflow Name | Triggers | Status |
| --- | --- | --- |
| Las Vegas | Manually on all services | Draft |
| Limited Services 1 | Conditionally on 113 services<br>Manually on 114 services | Published |
| Limited Services 10 | Manually on 10 services | Draft |
| Chicago | Conditionally on 2 services | Published |
| Limited Services 2 | Conditionally on 1 service<br>Manually on 90 services | Published |
| Workflow 5 | Conditionally on 1 service | Draft |

FIG. 4A

USING GENERATIVE AI TO MAKE A NATURAL LANGUAGE INTERFACE

TECHNICAL FIELD

This disclosure relates generally to using artificial intelligence to generate natural language user interfaces.

BACKGROUND

Operations computing systems may manage incidents triggered by events in computing systems that are registered to customer sites. Managing such incidents may be done through the use of workflows, or a set of actions, resources, services, messages, notifications, alerts, events, etc. related to resolving incidents. Typically, to create such workflows, an operations computing system may use various programming languages, markup languages, templates, or graphical interfaces that employ a drag-and-drop approach. However, an operations computing system may benefit from more user-friendly methods to create incident workflows, such as those that require even less user interaction.

SUMMARY

Aspects of the present disclosure describe techniques for using artificial intelligence to generate natural language user interfaces for incident workflow creation. In general, an operations computing system may receive an initial natural language text input associated with an incident from a user computing device. For example, the initial natural language input may be indicative of data for an incident workflow, such as one or more strings including example phrases such as, "Create a major incident workflow" or "Add John Doe as a responder with the message, 'Please help with this workflow'." The operations computing system may validate the input data using stored operations data and determine one or more prompts associated with the input data, in which the operations computing system may use an application programming interface (API) to implement a machine learning model configured to receive the prompts and facilitate a natural language conversation with the user.

For example, the machine learning model may generate text output for each prompt that includes a clarifying question and/or a clarifying instruction that is based on the input provided to the operations computing system. For example, based on an initial text input of "Add John Doe as a responder with the message 'Please help with this incident'," and a prompt for adding responders to an incident workflow, the text output generated by the model may be a string such as, "Do you want me to add any more responders and what do you want me to say when I notify them (the default is 'Please help me with {{incident.title}}-{{incident.url}}')?" The operations computing system may send the text output to the user computing device and receive, from the user computing device, additional natural language text input, which may be a response to the text output that is further indicative of data for the incident workflow. As such, the operations computing system may engage in a "natural language conversation" with a user of the user computing device to receive data for an incident workflow.

The operations computing system described herein may receive structured text data (e.g., formatted in JSON) for each prompt from the machine learning model. The operations computing system may use internal logic to manage any and all structured text data from the machine learning model, and may send an additional API request to the model including a prompt for generating instructions for an incident workflow based on the structured text data.

As such, by utilizing an API configured to call to an external machine learning platform that hosts, for example, a language model, the operations computing system described herein may facilitate natural language conversation with a user, receive structured text data based on the natural language conversation with the user, and create incident workflows based on the received structured text data. In other words, to create an incident workflow, the operations computing system described herein may take advantage of no-code/low-code methods that only require natural language input from a user, rather than more involved methods such as drag-and-drop or manual coding.

The techniques described herein may provide one or more technical advantages that realize one or more practical applications. Although operations computing systems are designed to monitor and manage the operations of one or more organizations (e.g., businesses), users of such operations computing systems (e.g., customers) may not have prior operations management or information technology (IT) experience. As such, users of an operations computing system may prefer more user-friendly and streamlined processes for monitoring and managing events, incidents, incident workflows, etc. associated with their organization. Furthermore, even users with prior IT experience may find it quicker, easier, and/or less error-prone to build incident workflows using the operations computing system described herein versus manually writing scripts or the like. As such, the techniques described herein, which combine the expertise of operations computing systems with the power of generative artificial intelligence, may provide more assistance to users and an overall better user experience when interacting with the operations computing system. For example, to edit or create incident workflows, rather than being required to heavily interact with buttons, tables, or other user interface elements, a user may simply provide natural language input in accordance with their specific needs. Furthermore, by applying machine learning models (e.g., large language models) through API requests, overall system performance may be further increased.

In one example, the disclosure is directed to a method that includes receiving, by a computing system, and from a user computing device, an initial natural language text input associated with an incident, generating, by the computing system and based on the initial natural language text input, a set of prompts including one or more prompts, and providing, by the computing system, the set of prompts as input to a machine learning model. The method may further include receiving, by the computing system and from the machine learning model, text output for each prompt from the set of prompts, wherein the text output includes one or more of a clarifying question and a clarifying instruction, sending, by the computing system and to the user computing device, the text output, and receiving, by the computing system, and from the user computing device, additional natural language text input. The method may further include applying, by the computing system, the machine learning model to the initial natural language text input and the additional natural language text input to generate respective initial structured text data for each prompt from the set of prompts, and applying, by the computing system, the machine learning model to the respective initial structured text data for each prompt from the set of prompts to generate updated structured text data, wherein the updated structured text data includes instructions for creating an incident workflow for the incident.

In another example, the disclosure is directed to a system that includes a memory and one or more processors having access to the memory. The one or more processors may be configured to receive, from a user computing device, an initial natural language text input associated with an incident, generate, based on the initial natural language text input, a set of prompts including one or more prompts, and provide the set of prompts as input to a machine learning model. The one or more processors may be further configured to receive, from the machine learning model, text output for each prompt from the set of prompts, wherein the text output includes one or more of a clarifying question and a clarifying instruction, send, to the user computing device, the text output, and receive, from the user computing device, additional natural language text input. The one or more processors may be further configured to apply the machine learning model to the initial natural language text input and the additional natural language text input to generate respective initial structured text data for each prompt from the set of prompts, and apply the machine learning model to the respective initial structured text data for each prompt from the set of prompts to generate updated structured text data, wherein the updated structured text data includes instructions for creating an incident workflow for the incident.

In another example, the disclosure is directed to a computer-readable storage medium encoded with instructions that, when executed, cause at least one processor of a computing system to receive, from a user computing device, an initial natural language text input associated with an incident, generate, based on the initial natural language text input, a set of prompts including one or more prompts, and provide the set of prompts as input to a machine learning model. The at least one processor may be further configured to receive, from the machine learning model, text output for each prompt from the set of prompts, wherein the text output includes one or more of a clarifying question and a clarifying instruction, send, to the user computing device, the text output, and receive, from the user computing device, additional natural language text input. The at least one processor may be further configured to apply the machine learning model to the initial natural language text input and the additional natural language text input to generate respective initial structured text data for each prompt from the set of prompts, apply the machine learning model to the respective initial structured text data for each prompt from the set of prompts to generate updated structured text data, wherein the updated structured text data includes instructions for creating an incident workflow for the incident, receive the updated structured text data, and create, based on the updated structured text data, the incident workflow.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

FIGS. 4A-4D are conceptual diagrams illustrating an example user interface sequence for incident workflow creation, in accordance with one or more aspects of the present disclosure.

Like reference characters denote like elements throughout the text and figures.

DETAILED DESCRIPTION

Figure 1:
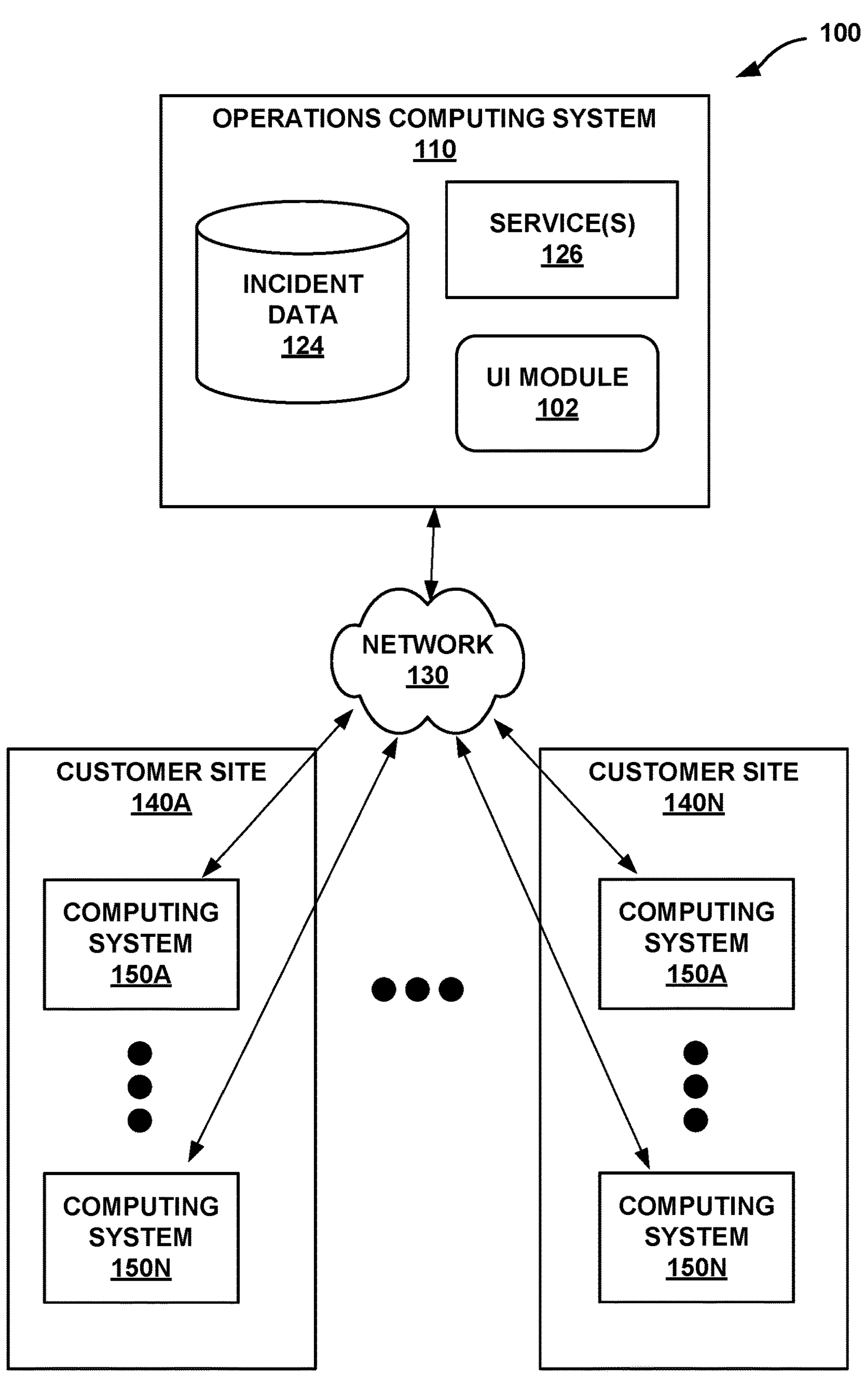
FIG. 1 is a block diagram illustrating an example system for generating natural language user interfaces to create incident workflows associated with events in one or more customer computing systems, in accordance with the techniques of this disclosure.

An example operations computing system may monitor, manage, or compare the operations of one or more organizations, such as a business, a company, an association, an enterprise, a confederation, or the like. The operations computing system may accept various events that indicate conditions occurring in the one or more organizations. The operations computing system may manage several separate organizations at the same time. For example, an event may be an indication of a state of change to an information technology service of an organization. An event can be or describe a fact at a moment in time that may consist of a single or a group of correlated conditions that have been monitored and classified into an actionable state. As such, a monitoring tool of an organization may detect a condition in the IT environment (e.g., such as the computing devices, network devices, software applications, etc.) of the organization and transmit a corresponding event to the operations computing system. Depending on the level of impact (e.g., degradation of a service), if any, to one or more constituents of a managed organization, an event may trigger (e.g., may be, may be classified as, may be converted into) an incident. As such, an incident may be an unplanned disruption or degradation of service.

The operations computing system described herein may provide users the ability to create incident workflows for incidents through the use of a natural language user interface facilitated by the operations computing system and a language model. In other words, a user of the operations computing system or a user of a device in communication with the operations computing system may interact with a natural language user interface, such as to provide natural language text input, in which the natural language text input may be used to create incident workflows with custom triggers, actions, and fields.

The operations computing system may generate one or more incident objects for one or more incidents that are based on event data received by the operations computing system from one or more customer sites. In some examples, the operations computing system may generate an incident workflow for each incident object automatically. In some examples, the operations computing system may generate an incident workflow in response to user input indicating a request to create an incident workflow (e.g., clicking a button on a user interface). In some examples, the operations computing system may provide a user the ability to edit an already-existing incident workflow. Regardless of whether a user is creating or editing an incident workflow, though, the operations computing system may receive and/or output natural language text, in which the natural language text may be indicative of data for the incident workflow.

As described herein, to facilitate the incident workflow creation using natural language, the operations computing system may employ an API configured to send input to and receive output from an external machine learning model, such as a language model. In some examples, prior to implementing the machine learning model, the operations computing system may perform one or more techniques for validating any input data received by the operations computing system. For example, the operations computing system may determine, based on stored data, whether the input data is valid, in which the stored data may include one or more of valid user data, valid computing system data, and valid workflow parameters data. In some examples, valid input data may include data pertaining to one or more of a trigger, an action, and a field for an incident workflow.

To facilitate a natural language "conversation" with a user, the operations computing system may apply, using the API, the machine learning model to an initial natural language text input received from a user computing device and one or more prompts associated with one or more tasks identified in the initial natural text input. As an example, if the initial natural language text input includes a string such as, "Add relevant stakeholders," then a prompt provided to the machine learning model may include the following: "You are a WorkflowBot, an automated service to help users create automated incident workflows. The user is trying to add stakeholders to be updated as an incident develops. You need to get the names of the stakeholders that they want to add. Instructions: If you do not have the names, then ask them the stakeholders they want to add. If you do have the names, then give them a list of the current names and ask them if there is anyone else they want to add. If they do not want to add anyone, then you reply with the names in list form such as ["name1", "name2", "name3"]." Then, based on the initial natural language text input and the prompt, the machine learning model may generate text output including a clarifying question or a clarifying instruction, such as "Please tell which stakeholders you want to add."

The text output may be received by the operations computing system and sent back to the user computing device, in which a user of the user computing device may provide additional natural language text input, e.g., a response to the text output. The operations computing system may receive the additional natural language text input, in which the machine learning model may determine whether the user has indicated they have no additional information to provide. In some examples, if the model determines the user has not indicated they have no additional information to provide, the model may further generate, based on the prompt, additional text output. In other words, the machine learning model may continue to facilitate the conversation with the user until the model determines the user has no additional information to provide for a specific prompt. Then, in examples in which more than one prompt is determined to be associated with the input, the operations computing system may implement the machine learning model again, in which the machine learning model may repeat the process for the other prompts. Upon the machine learning model sending all relevant information for each prompt (e.g., respective initial structured text data for each prompt from a set of prompts) back to the operations computing system, the operations computing system may then implement the machine learning model again, in which the operations computing system may provide all the relevant information back to the model along with a prompt instructing the model to generate data (e.g., updated structured text data) for creating an incident workflow.

As described herein, the initial structured text data and the updated structured text data may be JSON data (or some other type of structured data format) returned by the machine learning model based on the one or prompts and/or natural language input provided to the model. In some examples, however, the initial structured data may be incomplete or include irrelevant data. For example, in examples in which a user may be editing an incident workflow, the operations computing system may have stored data pertaining to a previous "conversation" between the user and operations computing system. As such, in these examples, the operations computing system may match the stored data with the initial structured text data to remove redundant data, etc. Furthermore, as described above, the operations computing system may additionally or alternatively validate any data returned by the machine learning model based on the stored data, which may include one or more of valid user data, valid computing system data, and valid workflow parameters data. As such, the structured text data used by the machine learning model to generate the updated structured text data (i.e., the data including instructions for generating the incident workflow) may only include data that has been validated by the operations computing system.

As such, the operations computing system described herein may employ a machine learning model, such as language model, to create valid incident workflows by generating API requests that include various prompts and natural language inputs indicative of validated data for the incident workflows. In this way, users without prior coding or information technology (IT) experience may more easily create or edit incident workflows, as a user may only be required to provide natural language input (i.e., colloquial language) to the operations computing system in order to create or edit such incident workflows.

FIG. 1 is a block diagram illustrating an example system for generating natural language user interfaces to create incident workflows associated with events in one or more customer computing systems, in accordance with the techniques of this disclosure. In the example of FIG. 1, system 100 may include operations computing system 110, customer sites 140A-140N (collectively referred to herein as "customer sites 140"), and network 130.

Network 130 may include any public or private communication network, such as a cellular network, Wi-Fi network, or other type of network for transmitting data between computing devices. In some examples, network 130 may represent one or more packet switched networks, such as the Internet. Operations computing system 110 and computing systems 150 of customer sites 140, for example, may send and receive data across network 130 using any suitable communication techniques. For example, operations computing system 110 and computing systems 150 may be operatively coupled to network 130 using respective network links. Network 130 may include network hubs, network switches, network routers, terrestrial and/or satellite cellular networks, etc., that are operatively inter-coupled thereby providing for the exchange of information between operations computing system 110, computing systems 150, and/or another computing device or computing system. In some examples, network links of network 130 may include Ethernet, ATM or other network connections. Such connections may include wireless and/or wired connections.

Customer sites 140 may be managed by an administrator of system 100. In some instances, customer sites 140 may include a cloud computing service, corporations, banks, retailers, non-profit organizations, or the like. Each customer site of customer sites 140 (e.g., customer site 140A and customer site 140N) may correspond to different customers, such as cloud computing services, corporations, etc.

Each of customer sites 140 may include computing systems 150A-150N (collectively referred to herein as "computing systems 150"). In some examples, one or more of computing systems 150 may operate within a business or other entity corresponding to one or more of customer sites 140 to perform a variety of services for the business or other entity. For example, a computing system of computing systems 150 may operate as a cloud computing system that provides one or more services via network 130, a web server, an accounting server, a production server, an inventory server, or the like. However, computing systems 150 are not constrained to these services and may also be employed, for example, as an end-user computing node, in other embodiments. Further, it should be recognized that more or less computing systems may be included within a system such as described herein, and embodiments are therefore not constrained by the number or type of computing systems employed.

Computing systems 150 may include a collection of hardware devices, software components, and/or data stores that can be used to implement one or more applications or services related to business operations of respective client sites 140. Computing systems 150 may represent a cloud-based implementation. In some examples, computing systems 150 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), or the like.

Operations computing system 110 may include virtually any network computer configured to provide computer operations management services. Operations computing system 110 may implement various techniques for managing data operations, networking performance, customer service, customer support, resource schedules and notification policies, event management, or the like for computing systems 150. Operations computing system 110 may interface or integrate with one or more external systems such as telephony carriers, email systems, web services, or the like, to perform computer operations management.

Operations computing system 110 may monitor the performance of computer operations of customer sites 140. For example, operations computing system 110 may monitor whether applications or systems of customer sites 140 are operational, network performance associated with customer sites 140, trouble tickets and/or resolutions associated with customer sites 140, or the like. Operations computing system 110 may include applications with computer executable instructions that transmit, receive, or otherwise process instructions and data when executed.

As described herein, operations computing system 110 may receive event data corresponding to various events and/or performance metrics from computing systems 150 of customer sites 140. The term "event," as used herein, can refer to one or more outcomes, conditions, or occurrences that may be detected (e.g., observed, identified, noticed, monitored, received, etc.) by operations computing system 110, which may perform functions similar to an event management bus. Operations computing system 110, as an event management bus (which can also be referred to as an event ingestion and processing system), may handle various types of events depending on the needs of an industry and/or technology area. For example, information technology services may generate events in response to one or more conditions, such as computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or a combination thereof. Other non-limiting examples of events may include a monitored operating system process not running, a virtual machine restarting, a disk space on a device is low, processor utilization on a device is higher than a threshold, a shopping cart service of an e-commerce site is unavailable, a digital certificate has expired or is expiring, a certain web server returning a 503 error code (indicating that web server is not ready to handle requests), a customer relationship management (CRM) system is down (e.g., unavailable) such as because it is not responding to ping requests, etc.

Event data may be provided to operations computing system 110 using one or more messages, emails, telephone calls, library function calls, application programming interface (API) calls, including, any signals provided to operations computing system 110 indicating that an event has occurred. One or more third party and/or external systems may generate event messages that are provided to operations computing system 110.

In some examples, event data corresponding to one or more events may be received by operations computing system 110. Operations computing system 110 may generate, based on the event data, an incident object for an incident, in which operations computing system 110 may further generate an incident workflow for the incident object. In some examples, however, an event (e.g., an event object), an incident (e.g., an incident object), and/or an incident workflow may be directly created (such as by a human) in operations computing system 110, or via a user computing device (e.g., one or more of computing systems 150) in communication with operations computing system 110.

The term "incident" as used herein can refer to a condition or state in the managed networking environments that requires some form of resolution by a person or an automated service. Typically, incidents may be a failure or error that occurs in the operation of a managed network and/or computing environment. One or more events may be associated with one or more incidents. However, not all events may be associated with incidents. The term "incident workflow" as used herein can refer to the actions, resources, services, messages, notifications, alerts, events, or the like, related to resolving one or more incidents. Accordingly, services that may be impacted by a pending incident, may be added to the incident workflow associated with the incident. Likewise, resources responsible for supporting or maintaining the services may also be added to the incident workflow. Further, log entries, journal entries, notes, timelines, task lists, status information, or the like, may be part of an incident workflow.

Processing an incident workflow can include triggering (e.g., creating, generating, instantiating, etc.) a corresponding alert in operations computing system 110, sending a notification of the incident to a responder (i.e., a person, a group of persons, etc.), and/or triggering a response (e.g., a resolution or set of actions) to the incident. An alert (an alert object) may be created (instantiated) for anything that requires the performance (by a human or an automated task) of an action. Thus, the alert may embody or include the action to be performed.

In some examples, operations computing system 110 may represent a cloud computing system or service that is accessible and executable by computing systems 150. In these examples, users of computing systems 150, or any other user of a user computing device in communication with operations computing system 110, may remotely access and execute one or more of the functionalities of operations computing system 110 via network 130 (e.g., the Internet), in which a user computing device may include at least one user interface device for receiving the initial natural language text input and the additional natural language text input from a user and displaying the text output to the user. In some examples, UI module 102 of operations computing system 110 may generate data for displaying the natural language user interface described herein, in which the instructions for displaying the natural language user interface may be sent to the user computing device (e.g., computing systems 150) and displayed via the one or more user interface devices of the user computing device.

In the example of FIG. 1, operations computing system 110 may include, but is not limited to, remote computing systems, such as one or more desktop computers, laptop computers, mainframes, servers, cloud computing systems, etc. capable of sending information to and receiving information from computing systems 150 via a network, such as network 130. Operations computing system 110 may host (or at least provides access to) information associated with one or more applications or application services executable by computing systems 150, such as operation management client application data. As described above, in some examples, operations computing system 110 represents a cloud computing system that provides application services via the cloud. Moreover, operations computing system 110 may not be limited to a particular configuration. Operations computing system 110 may operate using a master/slave approach over a plurality of network computers, within a cluster, a peer-to-peer architecture, and/or any of a variety of other architectures. As such, operations computing system 110 is not to be construed as being limited to a single environment, and other configurations, and architectures are also contemplated. Operations computing system 110 may employ processes such as described below in conjunction with at least some of the figures discussed below to perform at least some of its actions.

Operations computing system 110 may generate one or more incident workflows for one or more incidents, in which data pertaining to the incidents (i.e., incident data) and any user input associated with the incidents may be stored in incident data storage 124. Incident data storage 124 may include a data center, server room, computing devices, network devices, or the like for storing and/or organizing incident workflows associated with computing systems 150. Incident data storage 124 may be organized according to a database schema established by an administrator of operations computing system 110. As described herein, incident data storage 124 may store data used to validate any data received by operations computing system 110. For example, the stored data may include one or more of valid user data, valid computing system data (e.g., data associated with computing systems 150), and valid workflow parameters data.

Operations computing system 110 may also include one or more services 126 (referred to herein as "services 126"). Services 126 may include software tools, such as software automation tools, software modules, software engines, application programming interfaces (APIs), etc. Services 126 (e.g., incident management applications) may orchestrate and process (e.g., perform actions of) incident workflows related to managing operations of customer computing systems (e.g., computing systems 150). Services 126 may include computer readable instructions that, when executed by operations computing system 110, fetch and/or process other tasks associated with computing systems 150. For example, services 126 may fetch and process tasks, such as generating alerts. Operations computing system 110 may enqueue incident workflows associated with managing customer computing systems in a database.

As described herein, incident data storage 124 may store data pertaining to incident objects (e.g., a structured representation of an incident). An incident object may be a record that includes incident data, in which the incident data may further include one or more of a trigger, an action, and a field. As described herein, the incident data may be used to create an incident workflow. A trigger may include, for example, one or more of a manual trigger, an automatic trigger, a scheduled trigger, and an event-based trigger that initiates or starts a workflow. An action may include, for example, one or more of an addition of stakeholders, a sending of a status update, a creation of a message thread, a sending of a message thread link, an addition of responders, and a starting of a virtual meeting. A field (e.g., incident object attribute) may include one or more of an identifier, a title, a description, a timestamp, an incident type, an incident source, a severity level, one or more assigned users, an urgency level, a priority level, a current incident status, incident resolution data, one or more associated support tickets, and an action log. In some examples, the incident data may include event data.

The incident object may serve as the central piece of information that is processed and updated throughout an incident workflow. As described herein, incident data storage 124 may include incident objects with one or more identifier values (e.g., information associated with each incident), such as customer site identifiers, event identifiers, etc. For example, operations computing system 110 may assign each of customer sites 140 one or more identifier values to manage or group tasks associated with customer sites 140. In the example of FIG. 1, operations computing system 110 may assign an identifier value (e.g., a number, a hash value, a unique name, etc.) to each customer site of customer sites 140. For example, operations computing system 110 may assign customer site 140A an identifier value of "1401" and may assign customer site 140B an identifier value of "1454." Operations computing system 110 may generate an incident object for a customer site to include an identifier value corresponding to the customer site of customer sites 140 associated with the incident object. In some examples, operations computing system 110 may include multiple identifier values and/or multiple index data structures in an incident object for a customer site based on tiers that are assigned individual identifier values. Furthermore, any data generated or stored by operations computing system 110 may be associated with a particular identifier value. As an example, in some examples, the natural language "conversation" facilitated by operations computing system 110 with a user computing device (e.g., including all input and/or output associated with the conversation) may be stored in incident data storage 124 along with the incident that the natural language input is associated with. As such, in examples in which a user may edit a workflow, operations computing system 110 may match, e.g., based on the identifier value, any historical natural language input stored in incident data storage 124 with any current natural language text input. As such, operations computing system 110 may identify a continuation of a previous conversation, and/or identify whether the input received is valid with respect to the data stored in incident data storage 124. In this way, a user may not have to re-enter any input to create their desired incident workflow, and the incident workflow created by operations computing system 110 may only include valid and relevant incident data.

In some examples, incident data storage 124 may store any workflows created by operations computing system 110. In some examples, incident data storage 124 may include an incident object that points to a block of the database comprising computer readable instructions for processing an incident workflow created by operations computing system 110. Although illustrated as being included in operations computing system 110, services 126 and/or incident data storage 124 may be included on one or more computing systems 150 of customer sites 140 or on any other computing device or computing system not shown. For example, services 126 and incident data storage 124 may be included in computing systems 150 to manage processing of incident workflows associated with customer sites 140.

In some examples, each workflow generated by operations computing system 110 may include multiple "jobs," or multiple tasks executed by operations computing system 110. When responding to an incident, a user (i.e., a responder) may document the steps taken during the response that led to a resolution. In addition to actions or tasks such as an addition of stakeholders, a sending of a status update, a creation of a message thread, a sending of a message thread link, an addition of responders, and a starting of a virtual meeting, the incident workflows generated by operations computing system 110 may comprise other actions or tasks including, but not limited to, incident response diagnostic tasks, data distribution tasks, and/or service request automation tasks. Incident data storage 124 may store incident workflows that include a set of incident response diagnostic tasks such as enriching existing events with relevant data, logging incidents (e.g., time, date, and/or status of incidents), updating the status of a platform, updating the status of a service, updating the status of third party services, restarting services, restarting servers, unlocking databases, flushing storages, clearing files from memory, adding more disk or memory space, managing tickets (e.g., opening tickets, updating tickets, closing tickets), healing, incident escalation, etc. Incident data storage 124 may store incident workflows comprising a set of data distribution tasks such as job scheduling, extract-transform-load (ETL), file transfers, data removal, complex workflows or rules, data replication, data remodeling, database creation, etc. Incident data storage 124 may store incident workflows comprising a set of service request automation tasks such as infrastructure provisioning, automatically shutting down of unused cloud resources, managing users (e.g., onboarding users, deleting users, etc.), decommissioning hardware, adding servers, adding storage, software management (e.g., updating software, deploying software, etc.), managing cloud services (e.g., provisioning cloud services), opening ports, production patching, vulnerability patching, increasing capacity, establishing security procedures, validating security, changing configurations, adding Virtual Local Area Networks (VLANs), creating communication channels, adding server hosts, establishing firewall ports, validating Secure Sockets Layer (SSL) Certificates, getting Internet Protocol (IP) addresses, regulating IP addresses, benchmark testing, etc. In some instances, incident data storage 124 may store incident workflows comprising sets of tasks associated with customer sites 140 using software application tools, modules, engines, components, etc. that may identify tasks based on actions required for management of customer sites 140. Services 126 may obtain instructions to execute an incident workflow based on the incident object associated with the incident workflow.

In some examples, services 126 may obtain instructions to perform one or more actions included in the incident workflow from one or more engines or applications managed by operations computing system 110. Services 126 may include services that are designed to handle workflows for similar tasks. Services 126 may include specialized services that are managed and receive instructions from one or more applications implemented by operations computing system 110.

As described herein, operations computing system 110 may receive, from one or more of computing systems 150, an initial natural language text input associated with an incident, in which the incident may be created based on event data received by operations computing system 110 from customer sites 140 or based on a user directly creating the incident in operations computing system 110. In some examples, UI module 102 of operations computing system 110 may generate information for displaying the natural language user interface described herein, in which the information may be sent to one or more of computing systems 150 for display via one or more user interface devices. For example, a display screen of a computing system 150 may display the natural language user interface to a user of the computing system 150, in which the user may provide the initial natural language text input, such as "Add John Doe as a responder with the message 'Please help with this incident'." Operations computing system 110 may then receive the initial natural language text input from computing system 150 and send, back to computing system 150, text output that is based on the initial natural language text input and includes one or more of a clarifying question and a clarifying instruction. For example, following the previous example, the text output may be a string such as, "Do you want me to add any more responders and what do you want me to say when I notify them (the default is 'Please help me with {{incident.title}}-{{incident.url}}')?" As such, the user interface generated by UI module 102 of operations computing system 110 may be considered a natural language user interface, as the user interface may be configured to display an ordinary "conversation" between a user computing device (e.g., computing system 150) and operations computing system 110.

As described herein, based on the text output, operations computing system 110 may also receive, from computing system 150, additional natural language text input. As described herein, the initial natural language text input and the additional natural language text input may be indicative of data for the incident workflow, which may include one or more of a trigger, an action, and a field for the incident workflow. Thus, by outputting follow-up questions or clarifying instructions to a user, operations computing system 110 may receive additional data for incident workflows that may help users create such incident workflows more effectively and efficiently.

As described in more detail below with respect to FIGS. 2 and 3, while the natural language user interface presented to a user on the front-end may appear as a simple, natural conversation with operations computing system 110, the back-end of operations computing system 110 may utilize APIs and one or more machine learning models to facilitate the conversation. Specifically, to generate any text output (i.e., responses to a user's natural language input), to generate the initial structured data for the incident workflow, and/or to generate the updated structured text data for the incident workflow, operations computing system 110 may apply a machine learning model (e.g., a machine learning model stored in operations computing system 110 and/or a machine learning model externally hosted on a platform that can be accessed via an API) configured to receive natural language inputs and/or prompts and generate output based on the natural language inputs and/or prompts. As an example, along with the natural language input, an example prompt may be provided to the machine learning model, such as "Based on the JSON file for adding stakeholders and sending status updates, provide a JSON response including instructions for generating an incident workflow, and include triggers and actions." Additionally, as described in FIGS. 2 and 3, the additional prompts provided to the machine learning model may be generated by operations computing system 110, e.g., using machine learning techniques or logic.

In this way, the techniques described herein may benefit users who prefer no-code or low-code interactions with operations computing systems. Specifically, provided that the operations computing system described herein is configured to engage in natural language conversation with a user in order to generate an incident workflow, users may be able to easily and effectively create and/or edit incident workflows tailored to their specific needs without having to create API requests or apply machine learning techniques themselves. Additionally, by employing computationally expensive or more powerful machine learning algorithms through API requests, the operations computing system may improve the front-end experience for users and overall system performance.

Figure 2:
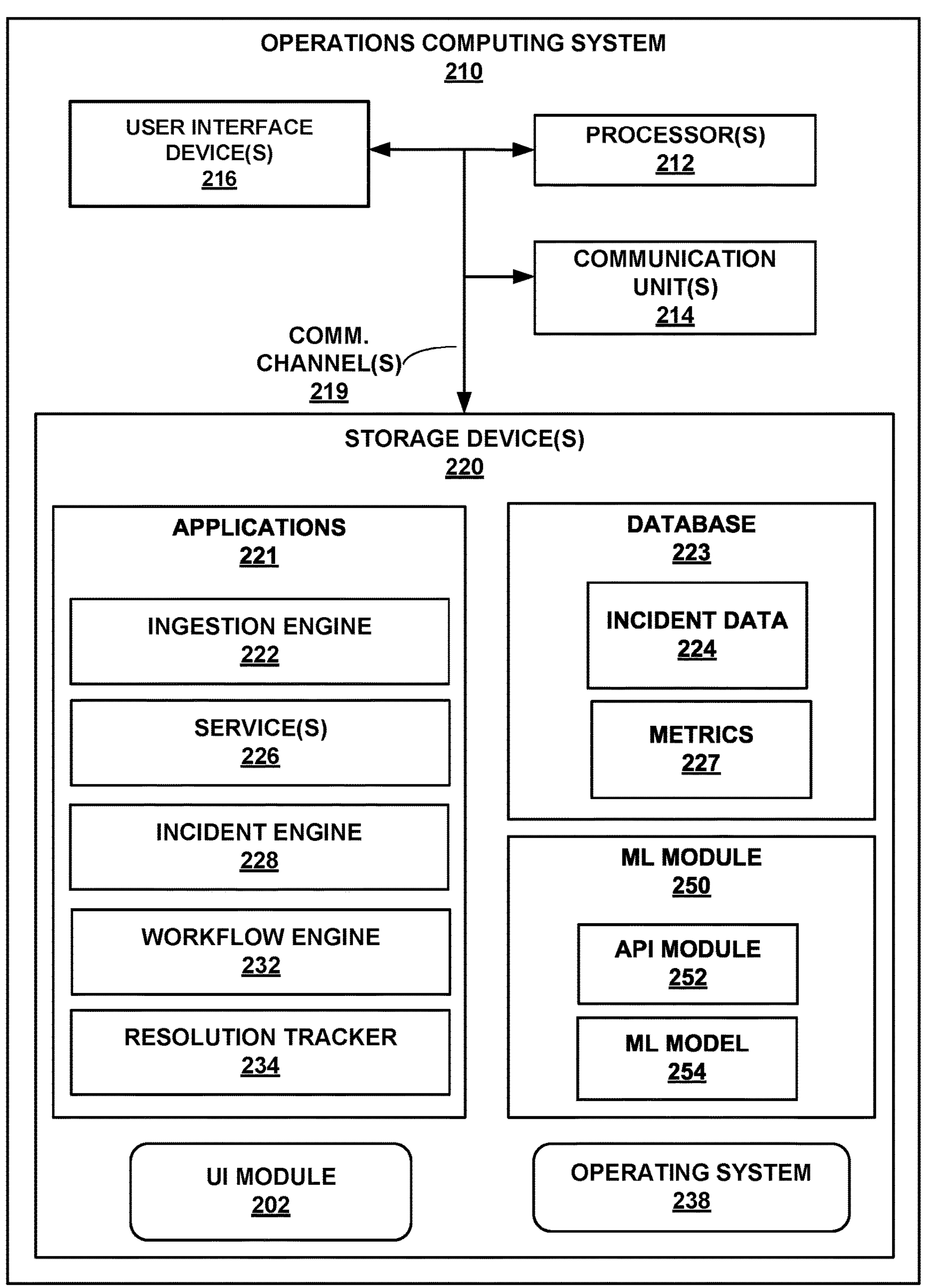
FIG. 2 is a block diagram illustrating an example computing system for generating natural language user interfaces for incident workflow creation, in accordance with one or more techniques of this disclosure.

FIG. 2 is a block diagram illustrating an example computing system for generating natural language user interfaces for incident workflow creation, in accordance with one or more techniques of this disclosure. Operations computing system 210 may be an example implementation of operations computing system 110 of FIG. 1. In the example of FIG. 2, UI module 202, incident data storage 224, and services 226 may correspond to UI module 102, incident data storage 124, and services 126 of FIG. 1, respectively.

Computing system 210, in the example of FIG. 2, may include user interface (UI) devices 216, processors 212, communication units 214, and storage devices 220. Communication channels 219 ("COMM channel(s) 219") may interconnect each of components 212, 214, 216, and 220 for inter-component communications (physically, communicatively, and/or operatively). In some examples, communication channel 219 may include a system bus, a network connection, an inter-process communication data structure, or any other method for communicating data.

UI devices 216 may function as an input device and/or an output device for operations computing system 210. UI device 216 may be implemented using various technologies. For instance, UI device 216 may receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitive touchscreen, a pressure sensitive screen, an acoustic pulse recognition touch screen, or another presence-sensitive technology. That is, UI device 216 may include a presence-sensitive device that may receive tactile input from a user of operations computing system 210.

UI device 216 may additionally or alternatively function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, miniLED, microLED, organic light-emitting diode (OLED) display, e-ink, or similar monochrome or color display capable of outputting visible information to a user of operations computing system 210. Additional examples of an output device include a speaker, a haptic device, or other device that can generate intelligible output to a user. For instance, UI device 216 may present output as a graphical user interface that may be associated with functionality provided by operations computing system 210.

Processors 212 may implement functionality and/or execute instructions within operations computing system 210. For example, processors 212 may receive and execute instructions that provide the functionality of applications 221 and OS 238. These instructions executed by processors 212 may cause operations computing system 210 to store and/or modify information within storage devices 220 or processors 212 during program execution. Processors 212 may execute instructions of applications 221 and OS 238 to perform one or more operations. That is applications 221 and OS 238 may be operable by processors 212 to perform various functions described herein.

Storage devices 220 may store information for processing during operation of operations computing system 210 (e.g., operations computing system 210 may store data accessed by applications 221 and OS 238 during execution). In some examples, storage devices 220 may be a temporary memory, meaning that a primary purpose of storage devices 220 is not long-term storage. Storage devices 220 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 220 may include one or more computer-readable storage media. Storage devices 220 may store larger amounts of information than volatile memory. Storage devices 220 may further be configured for long-term storage of information as non-volatile memory space and retain information after power on/off cycles. Examples of non-volatile memories include magnetic hard disks, optical discs, floppy discs, flash memories, or forms of electrically programmable memories (EPROM) or electrically erasable and programmable (EEPROM) memories. Storage devices 220 may store program instructions and/or information (e.g., within database 223) associated with applications 221 and OS 238.

Communication units 214 may communicate with one or more external devices via one or more wired and/or wireless networks by transmitting and/or receiving network signals on the one or more networks. Examples of communication units 214 include a network interface card (e.g., such as an Ethernet card), an optical transceiver, a radio frequency transceiver, a GNSS receiver, or any other type of device that can send and/or receive information. Other examples of communication unit 214 may include short wave radios, cellular data radios (for terrestrial and/or satellite cellular networks), wireless network radios, as well as universal serial bus (USB) controllers.

OS 238 may control the operation of components of operations computing system 210. For example, OS 238 may facilitate the communication of applications 221 with processors 212, storage devices 220, and communication units 214. OS 238 may have a kernel that facilitates interactions with underlying hardware of operations computing system 210 and provides a fully formed application space capable of executing a wide variety of software applications having secure partitions in which each of the software applications executes to perform various operations.

Applications 221 may include ingestion engine 222, services 226, incident engine 228, workflow engine 232, and resolution tracker 234. Ingestion engine 222 may receive and/or obtain one or more different types of operations events provided by various sources. Ingestion engine 222 may obtain operations event data pertaining to one or more events, such as alerts regarding system errors, warnings, failure reports, customer service requests, status messages, or the like. Ingestion engine 222 may obtain event data that may be variously formatted messages that reflect the occurrence of events and/or incidents that have occurred in an organization's computing system (e.g., computing systems 150 of FIG. 1). Ingestion engine 222 may obtain event data that may include SMS messages, HTTP requests or posts, API calls, log file entries, trouble tickets, emails, or the like. Ingestion engine 222 may obtain event data that may be associated with one or more service teams that may be responsible for resolving issues related to the events. In some examples, ingestion engine 222 may obtain event data from one or more external services that are configured to collect event data.

Ingestion engine 222 may orchestrate various actions related to the obtained event data. Ingestion engine 222 may employ (e.g., generate computer-readable instructions, configure, etc.) one or more services of services 226 to perform the actions related to event data. For example, ingestion engine 222 may employ services 226 to filter event data, reformat event data, extract information from event data, or normalize event data. In some examples, ingestion engine 222 may determine whether the event data constitutes one or more incidents, and may generate one or more incident objects for each incident based on the event data. In other examples, services 226 may generate one or more incident objects for each incident based on operations performed by ingestion engine 222. For example, ingestion engine 222 or services 226 may determine incident data based on rules, conditions, notification rules, escalation rules, routing keys, or the like, or combination thereof, that may be associated with different types of events. For example, ingestion engine 222 or services 226 may determine that some events (e.g., of the frequent type) may be informational rather than associated with a critical failure. Ingestion engine 222 may employ services 226 to perform various actions, such as storing incident data (including, for example, event data) for one or more incident objects in incident data storage 224 for eventual analysis or processing by one or more of the components described herein.

Services 226 may include one or more software components that generate computer-readable instructions, one or more microservices, computing devices, computing systems, or other pieces of computing infrastructure. Services 226 may be operated, managed, monitored, and/or configured by one or more teams associated with operations computing system 210. Services 226 may be employed by applications of applications 221 to process tasks or workflows generated by any of applications 221. In some instances, services of services 226 may assign tasks to other services of services 226.

Incident engine 228 may orchestrate various actions related to analyzing event data. For example, incident engine 228 may determine incident data to include in each incident object. For example, incident engine 228 may determine tasks related to actions of alerting services 226 or teams of operations computing system 210 of an event. Incident engine 228 may determine tasks related to classifying events based on severity (e.g., critical, error, warning, information, unknown, etc.). Incident engine 228 may determine tasks related to determining a time frame or urgency for addressing an incident. Incident engine 228 may determine tasks related to outputting the severity of operations events to services 226 or teams of operations computing system 210. Incident engine 228 may determine tasks related to notifying relevant computing systems of incidents. Incident engine 228 may determine tasks related to prioritizing incidents for eventual processing. Incident engine 228 may determine tasks related to identifying templates of actions that may be used to resolve certain incidents in an automated way. As such, in some examples, the data determined by incident engine 228 may be used by one or more machine learning models described herein and/or may be used to generate one or more suggested natural language text inputs to a user for incident workflow creation. Furthermore, incident engine 228 may perform one or more techniques for validating input received by operations computing system 110, e.g., from a user computing device and/or the external machine learning model described herein. For example, incident engine 228 may determine, based on stored data (e.g., incident data determined by ingestion engine 222, incident engine 228, and/or data stored in incident data storage 224, such as one or more of valid user data, valid computing system data, and valid workflow parameters data), whether the initial natural language text input and the additional natural language text input is valid. Furthermore, in some examples, incident engine 228 may validate any structured text data output by ML module 250.

Workflow engine 232 may generate workflows for each incident object based on the output received from machine learning module 250, and orchestrate various actions related to the workflows for addressing incidents. For example, workflow engine 232 may create an incident workflow for each of the one or more incident objects that is created by ingestion engine 222 and/or passed into ML module 250. In some examples, as described herein, ML module 250 may generate structured text data including instructions for creating the incident workflow, in which the structured text data may be, for example, in a JSON format and may include data structures and information for an incident workflow. In some examples, the structured text data may include incident object data (e.g., data for the incident workflow) defined by a user using the natural language user interface described herein, such as one or more of a trigger, an action, and a field for the incident workflow. For example, a trigger may include one or more of a manual trigger, an automatic trigger, a scheduled trigger, and an event-based trigger for the incident workflow. An action may include one or more actions for the incident workflow, such as an addition of stakeholders, a sending of a status update, a creation of a message thread, a sending of a message thread link, an addition of responders, and a starting of a virtual meeting. A field for the incident workflow may include one or more of an identifier, a title, a description, a timestamp, an incident type, an incident source, a severity level, one or more assigned users, an urgency level, a priority level, a current incident status, incident resolution data, one or more associated support tickets, and an action log. Workflow engine 232 may receive the structured text data from ML module 250, create an incident workflow based on the structured text data (in which the incident workflow may include any of the aforementioned data), and store the incident workflow in incident data storage 224.

In some examples, additionally or alternatively to using the structured text data generated by ML module 250, workflow engine 232 may further determine tasks related to jobs or processes of executing scripts, commands, or plugins that address incidents. Workflow engine 232 may determine tasks related to runbooks or a compilation of routine operating procedures for managing computing systems 150. Workflow engine 232 may map incidents to one or more workflows that may be executed to resolve at least part of an incident. Workflow engine 232 may employ services 226 to perform various actions, such as storing any incident workflows created for any incident objects in incident data storage 224 for eventual processing by one or more services of services 226.

Resolution tracker 234 may monitor details related to the status of incidents determined by operations computing system 210. For example, resolution tracker 234 may monitor incident life-cycle metrics associated with incidents (e.g., creation time, acknowledgement time(s), resolution time, etc.), resources responsible for resolving the incidents (e.g., applications 221), and so on. Resolution tracker 234 may store data obtained from monitoring the details related to the status of incidents in database 223 for compilation by metrics 227.

In some examples, applications 221 may determine tasks associated with customers managed by operations computing system 210. In some instances, services of services 226 may determine tasks to be processed by other services of services 226. In some instances, engines 222, 228, and 232 may determine tasks to be processed by services of services 226. As described herein, operations computing system 210 may identify one or more tasks included in the natural language input provided to operations computing system 210, and determine one or prompts associated with the one or more identified tasks. For example, in some examples, one or more of applications 221 may be configured to analyze natural language input to determine one or more tasks, such as adding responders, adding stakeholders, sending a status update, creating a message thread, sending a message thread link, and starting a virtual meeting. In some examples, ingestion engine 222 of applications 221 may determine tasks associated with ingesting operations events associated with customer computing systems. Incident engine 228 may determine tasks associated with determining incidents, classifying incidents, and/or notifying teams about incidents. Workflow engine 232 may determine incident workflows associated with templates of actions to resolve incidents. In other examples, operations computing system 210 may apply ML model 254 to the natural language input to determine tasks, prompts, and/or other data for an incident workflow. In some examples, operations computing system 210 may execute API module 252 to send an API request to the external machine learning model described herein, in which the external machine learning model may determine tasks and/or other data for the incident workflow. In some examples, however, data collected and/or generated by one or more of applications 221 may also be provided to the external machine learning model via API module 252 in addition to any natural language input and/or prompts provided to the external machine learning model.

In some examples, services 226 may be employed by an application of applications 221 to send and receive data from other applications of applications 221 and/or other modules of operations computing system 210. In some examples, a service of services 226 may obtain instructions from ingestion engine 222 to perform actions related to incident workflows, such as resolving incidents. In some examples, a service of services 226 may obtain instructions from incident engine 228 to perform actions related to determining incidents, classifying incidents, and/or notifying teams about incidents.

Database 223 may include incident data storage 224 and metrics 227. Metrics 227 may process the data related to the status of incidents into operations metrics. Metrics 227 may compute operations metrics such as mean-time-to-acknowledge (MTTA), mean-time-to-resolve (MTTR), incident count per resolvers, resolution escalations, uniqueness of events or incidents, auto-resolve rate, time-of-day of incidents, adjusting for multiplier events per single incident, service dependencies, infrastructure topology, or the like. In some instances, operations computing system 210 may replace certain incident data included in an incident object (e.g., a priority level) with new incident data based on metrics 227.

In accordance with the techniques described herein, operations computing system 210 may generate, via UI module 202, a natural language user interface for display on a user computing device, in which operations computing system 210 may receive natural language input from the user computing device, and based on one or more identified tasks and one or more prompts associated with the identified tasks, provide natural language output back to the user computing device, such that the user interface generated by UI module 202 facilitates a natural language "conversation" with a user of the user computing device. As described herein, operations computing system 210 may receive initial natural language text input and additional natural language text input that are indicative of data for an incident workflow.

As described above, to generate the natural language text output, operations computing system 210 may generate, based on the initial natural language text input, a set of prompts including one or more prompts, in which the set of prompts are associated with one or more identified tasks described above. In some examples, based on the identified tasks, operations computing system 110 may further identify whether any workflows stored in incident data storage 224 are associated with the identified tasks, e.g., based on conversation identifiers, user data, etc. Thus, in some examples, operations computing system 110 may either "add-on" to or edit an existing incident workflow, or alternatively, create a new incident workflow.

Operations computing system 210 may provide the set of prompts as input to a machine learning model implemented by ML module 250. The set of prompts may include at least one prompt for each identified task, in which each prompt may include instructions for how the machine learning model should gather input from a user. For example, an example prompt associated with an identified task of adding stakeholders may include: "You are WorkflowBot, an automated service to help users create automated incident workflows. The user is trying to add stakeholders to be updated as an incident develops. You need to get the names of the stakeholders that they want to add. Instructions: If you do not have the names then ask them the stakeholders they want to add. If you do have the names, then give them a list of the current names and ask them if there is anyone else they want to add. If they do not want to add anyone then you reply with the names in list form such as ["name1", "name2", "name3"]. Messages are given in a JSON format. Questions to the user are to be given in the "prompt_message" section. Always summarize the current status of the request in this section (names and message). If you have all the information you need and the user has indicated that they don't want to add any more information, set the "is_complete" flag in the output block to true, otherwise use false. Please return the output JSON only." As such, for each prompt provided to the machine learning model, the machine learning model may continuously generate text output including one or more clarifying questions and/or clarifying instructions until the machine learning model has determined that the user has no additional information to add.

As another example, API module 252 may send an API request to an external platform hosting the machine learning model that includes an initial natural language text input such as "Add new responders and create a shared message thread." API module 252 may include a first associated prompt in the API request, such as "You are an engine to help users to complete tasks. There are a limited number of tasks that we support, these are: 'add-user-responders', 'create-message-thread', 'add-stakeholders', 'add-conference-bridge', 'create-virtual-meeting'. You are to work out which tasks the user wants to accomplish and return a JSON list of those tasks in the order they are given. If you cannot work out which task they want, reply and empty list. You are only allowed to reply with a list of those options." API module 252 may additionally send one or more other associated prompts in the API request, such as a prompt for gathering data related to the identified task of adding new responders and a prompt for gathering data related to the creation of a shared message thread.

As an example, for gathering data related to the identified task of adding new responders, operations computing system 210 may receive, from the machine learning model, text output such as "Please tell which responders you want to add." The text output may then be sent from operations computing system 210 to the user computing device and displayed to the user via the natural language user interface. The user may then provide additional natural language text input, such as "Jane Doe and John Smith." Operations computing system 210 may receive the additional natural language text input, in which API module 252 may send the additional natural language text input back to the machine learning platform. As in this example, in some examples, the machine learning model may generate, based on the initial natural language text input and the additional natural language text input, one or more additional text outputs, such as "Do you want me to add any additional responders?".

Following the previous example, for gathering data related to the creation of a shared message thread, operations computing system 210 may receive, from the machine learning model, text outputs such as "Please tell the names of whom you want to share the message thread with", "Would you like to share the message thread with anyone else?", etc. As described above, in some examples, natural language input and output may be exchanged between operations computing device 210 and a user computing device for each prompt until operations computing device 210 receives input for a specific prompt indicating that a user has no further input to provide or that a user does not want to add any additional information, such as a string including the word "No." In these examples, responsive to determining that the user is done providing input for a specific prompt, the machine learning model may return the respective initial structured text data for the specific prompt that indicates all input has been received and includes all relevant data gathered (e.g., the names of the stakeholders the user wishes to add). For example, the machine learning model may output initial structured data in the form of a JSON list comprising the tasks that the user wants to accomplish, in which the tasks were determined by the machine learning model based on all of the natural language text input.

API module 252 may receive the initial structured text data. However, as described above, in some examples, the initial structured data may be incomplete, include irrelevant or redundant data, may not be in the most suitable format for creating an incident workflow, or may only represent data relating to one prompt from a set of prompts. As such, upon receiving the respective initial structured text data for each prompt from the set of prompts, in some examples, operations computing system 210 may process the respective initial structured text data for each prompt based on rules, conditions, logic, etc. or implement one or more data preprocessing techniques. As described herein, operations computing system 210 may further implement one or more techniques for validating any data received by the machine learning model, such as by comparing the received data to stored data that includes one or more of valid user data, valid computing system data, and valid workflow parameters data.

API module 252 may send another API request to the external machine learning platform that includes the respective initial structured text data for each prompt and, in some examples, one or prompts that further specify how the output of the machine learning model should be generated. For example, the API request may include a prompt such as: "Based on the JSON file for adding stakeholders and sending status updates, provide a JSON response including instructions for generating an incident workflow, and include triggers and actions." The machine learning model may be applied to the respective initial structured text data for each prompt and one or more additional prompts to generate updated structured text data, in which the updated structured text data may include instructions for creating an incident workflow. For example, following the previous example, the API request may include the JSON list comprising the tasks that the user wants to accomplish and the example prompt indicating a request to create an incident workflow. The machine learning model may be applied to the example API request data and output the updated structured text data, which may be a JSON response including instructions for generating a workflow that includes, for example, actions for adding new responders, creating the shared message thread, and one or more triggers previously defined. Operations computing system 210 may receive the updated structured text data, and create, based on the updated structured text data, the incident workflow.

As described above, one or more machine learning models described herein may be hosted on an external platform or included in an operating system of an external computing device (e.g., in a central intelligence layer of an operating system) and may be called or otherwise used by operations computing system 210, in which operations computing system 210 may communicate with the central intelligence layer (and model(s) stored therein) using an API (e.g., a common, public API). In some examples, a user of operations computing system 210 may initiate the API call. In some examples, API module 252 may enable the exchanging of data in a standardized format, and may support, for example, REST (Representational State Transfer), which is an architectural style for building APIs that use HTTP (Hypertext Transfer Protocol) to exchange data between applications.

Although the techniques described herein mostly involve the use of machine learning models hosted on external platforms, in some examples, operations computing system 210 may execute one or more local machine learning models, such as ML model 254 of ML module 250. As such, in some examples, some or all of the functions performed by the external machine learning model described herein may be performed by ML model 254. In some examples, ML model 254 may be implemented for prompt engineering, in which ML model 254 may be configured to generate one or more prompts based on the natural language input received by operations computing system 210 or based on data stored by operations computing system 210. As described above, the prompt may include one or more additional parameters, instructions, examples, etc. for the external machine learning model to use when generating output. In some examples, a prompt may be "optimized" by ML model 254, in which ML model 254 may intelligently generate a prompt based on current data received by operations computing 210 and/or historical data received by operations computing 210. In some examples, ML model 254 may analyze the respective initial structured text data for each prompt received by operations computing system 210 and generate a prompt for the external machine learning model to generate the updated structured text data. As such, in some examples, API module 252 and/or other modules of operations computing system 210 may utilize one or more machine learning models, rules, conditions, logic, a combination thereof, or the like, to process or manipulate any data received or output by operations computing system 210.

As described, the updated structured text data received by operations computing system 210 may include instructions for creating (or in some examples, editing) an incident workflow. Responsive to receiving the updated structured text data, operations computing system 210 (e.g., workflow engine 232) may create the incident workflow, in which the incident workflow may be stored in incident data storage 224. In some examples, operations computing system 210 may receive user input to further configure the data for the incident workflow, in which operations computing system 210 may execute the techniques described above again using the natural language user interface, or using another user interface generated by UI module 202.

Figure 3:
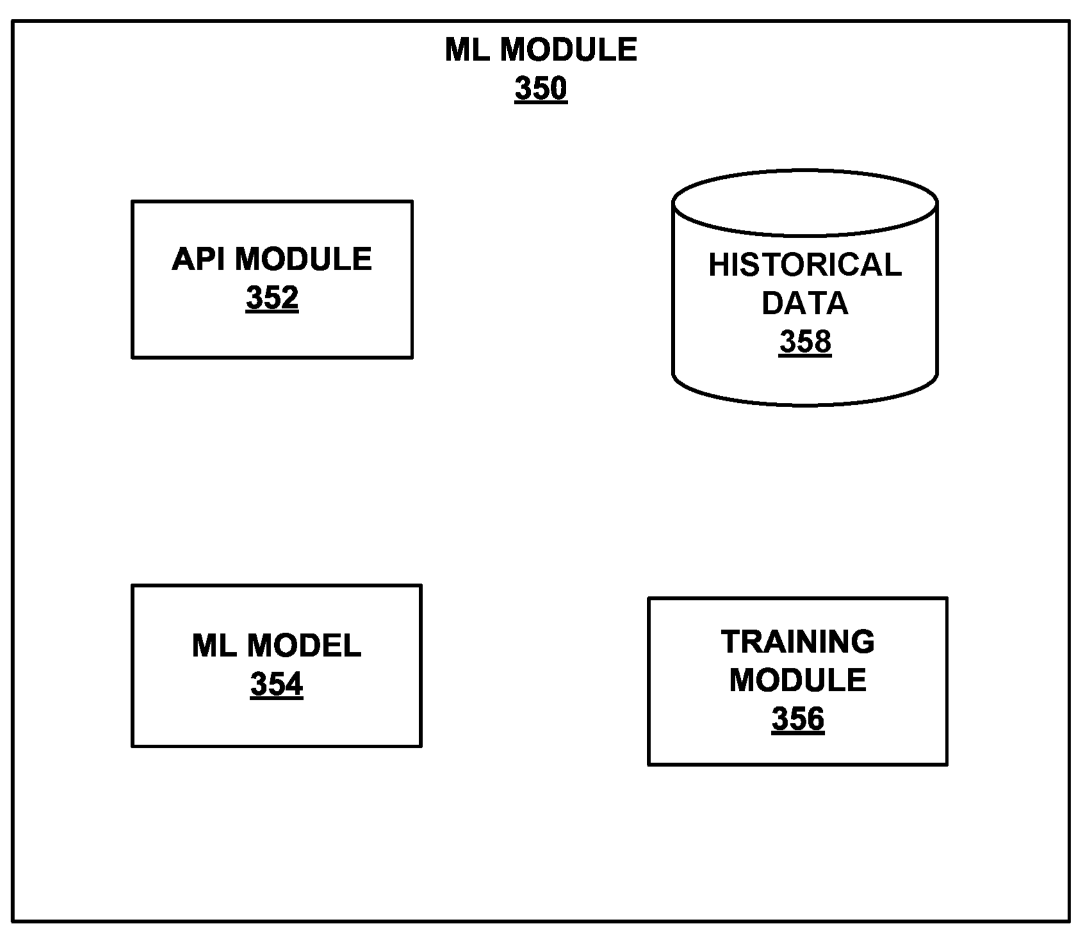
FIG. 3 is a conceptual diagram illustrating an example machine learning module for generating natural language user interfaces for incident workflow creation, in accordance with techniques of this disclosure.

FIG. 3 is a conceptual diagram illustrating an example machine learning module for generating natural language user interfaces for incident workflow creation, in accordance with techniques of this disclosure. FIG. 3 is discussed with respect to FIGS. 1-2 for example purposes only. In the example of FIG. 3, machine learning module 350 and API module 352 may be example implementations of machine learning module 250 and API module 252 of FIG. 2, respectively. As shown in the example of FIG. 3, machine learning module 350 also includes machine learning model 354, training module 356, and historical data 358. As described above, in some examples, the operations computing system described herein may use API module 352 to apply a machine learning model externally hosted on a platform to generate output for creating an incident workflow. In some examples, the operations computing system may apply a machine learning model locally stored in the operations computing system, such as machine learning model 354, to generate various data that can be provided to the external machine learning model, or, in some examples, to generate output for creating an incident workflow.

In some examples, machine learning module 350 may implement both machine learning model 354 and a machine learning model externally hosted on a platform that is called to using API module 352. For example, the one or more prompts provided to the external machine learning model may be automatically generated by machine learning model 354, in which machine learning model 354 may generate one or more prompts based on data stored in historical data 358. Historical data 358 may include historical user data and/or historical incident workflow data. For example, historical data 358 may store data indicating common natural language input and/or prompts used to create incident workflows. As such, machine learning model 354 may optimize one or more prompts included in the API request sent by API module 352. In these examples, training module 356 may train machine learning model 354 to accurately identify relevant incident data to include in a prompt, to generate a prompt that is similar to prompts stored in historical data 358, to accurately format the API request provided to API module 352, to accurately handle secrets, passwords, API tokens or keys, or any other data that require privacy or security, etc.

The machine learning models described herein, such as machine learning model 354 and any other machine learning model utilized by the operations computing system (e.g., any models used via API module 352), may include one or more language models (e.g., a generative artificial intelligence model, a large language model, or the like). Machine learning module 350 may implement other machine-learned models that may be used in place of or in conjunction with one or more language models. Machine learning module 350 may perform various types of natural language processing (NLP) based on data received or stored by the operations computing system (e.g., incident data, natural language user input data, etc.) or "input data". Machine learning module 350 may use or send an API request via API module 352 to a platform that provides recurrent neural networks (RNNs) and/or transformer models (self-attention models), such as GPT-3, BERT, and T5. In some examples, machine learning module 350, or an external platform called to by API module 352, may perform classification, summarization, name generation, regression, clustering, anomaly detection, recommendation generation, and/or other tasks.

In some examples, machine learning model 354 may be trained using training module 356. Machine learning model 354 may be trained online or offline. In some examples, machine learning model 354 may be trained on a static basis, in which training module 356 may train machine learning model 354 using historical data 358. In some examples, historical incident data may be manually labeled. In some examples, training module 356 may fine-tune machine learning model 354 such that machine learning model 354 more accurately determines one or more prompts for one or more tasks identified in the natural language input received by operations computing system 210.

In some examples, as described above, historical data 358 may store historical prompts and/or input. In some examples, historical data 358 may store historical incident workflow data, historical natural language text input, historical prompts, etc. In some examples, as described herein, operations computing system 210 may determine, based on historical data 358, whether the data received by operations computing system 210 is valid (e.g., whether the natural language input is indicative of valid incident workflow data or associated with valid user data or valid computing system data). In these examples, responsive to determining that the data received by operations computing system 210 is valid, operations computing system 210 may then send an API request including the valid data to the machine learning model described herein, or may generate an incident workflow based on the valid data. Specifically, in some examples, training module 356 may train one or more models implemented by machine learning module 350 to recognize invalid and valid prompts and/or inputs, such as by analyzing the prompts and/or inputs with respect to the stored data that includes one or more of valid user data, valid computing system data, and valid workflow parameters data. In some examples, at least some of the valid prompt and/or input training data and/or the invalid prompt and/or input training data may include respective descriptions of why the prompt and/or input training data is either valid or invalid. To illustrate, the invalid natural language input training data may include an invalid natural language input such as, for example, "Write a haiku about a summer day." Optionally, the invalid natural language input data may additionally include a description such as "this input is invalid because it is not related to an incident workflow." In another example, the valid natural language input training data may include a valid natural language input such as "Add the flexible workflows escalation policy as responders." Optionally, the valid natural language input training data may additionally include a description such as "this request is valid because it relates to an incident workflow." In some examples, training module 356 may train one or more models implemented by machine learning module 350 to determine whether a prompt and/or input is ambiguous or overly broad, such as "Create a workflow with a priority level based on the vulnerabilities found in the database." Finding vulnerabilities may mean to look for security vulnerabilities, to look for relational issues or inconsistencies, or some other meaning. As such, machine learning module 350 may determine such prompts and/or inputs to be invalid.

In other examples, API module 352 may send an API request including the initial natural language text input and/or the additional natural language text input to the external machine learning platform described herein, in which the external machine learning model may determine whether the initial natural language text input and/or the additional natural language text input is valid or invalid based on the one or more prompts provided to the machine learning model. For example, in some examples, operations computing system 210 may apply, using API module 352, the machine learning model to the initial natural language text input and/or the additional natural language text input to determine whether the data for the incident workflow is valid, i.e., whether the natural language input and/or the additional natural language text input indicative of the data for the incident workflow is valid. In these examples, responsive to determining that the data for the incident workflow is valid, the machine learning model may further generate the initial structured text data, e.g., the API request may include a prompt specifying that the machine learning model must determine the input to be valid before generating any additional output data, such as the structured text data.

In some examples, operations computing system 210 may receive user input to further configure the data for an incident workflow. In examples in which a user manually configures data for an incident workflow (or in some examples, initiates another conversation with the operations computing system via the natural language user interface to edit the incident workflow) after machine learning module 350 has implemented one or more machine learning models to generate instructions for creating the incident workflow, data indicating this change may be stored in metrics 227 of FIG. 2 and/or historical data 358, in which the data may be used as training data by training module 356 to fine-tune the one or more machine learning models. In some examples, feedback may be provided to the one or more machine learning models immediately after the feedback data is received or in intervals.

As described above, the final output of machine learning module 350 may include updated structured text data including instructions for creating an incident workflow, in which the instructions may include data specified by a user for each identified task through interaction with the natural language user interface. As such, the operations computing system described herein may allow users to easily create and/or manipulate incident workflows through the use of natural language conversation, rather than through high coding or other highly involved methods. In this way, users may enjoy a less intensive user experience when interacting with the operations computing system. Additionally, by utilizing machine learning module 350, the techniques described herein may benefit from highly-trained artificial intelligence models that can help to reduce errors in incident workflow creation and management. Furthermore, the techniques described herein may allow users to fine-tune input as needed, and because input can be provided as natural language, may reduce the time and effort required to fine-tune such input. As such, the techniques described herein may improve the quality of service provided by the operations computing system, and thus overall user satisfaction.

Figure 4B:
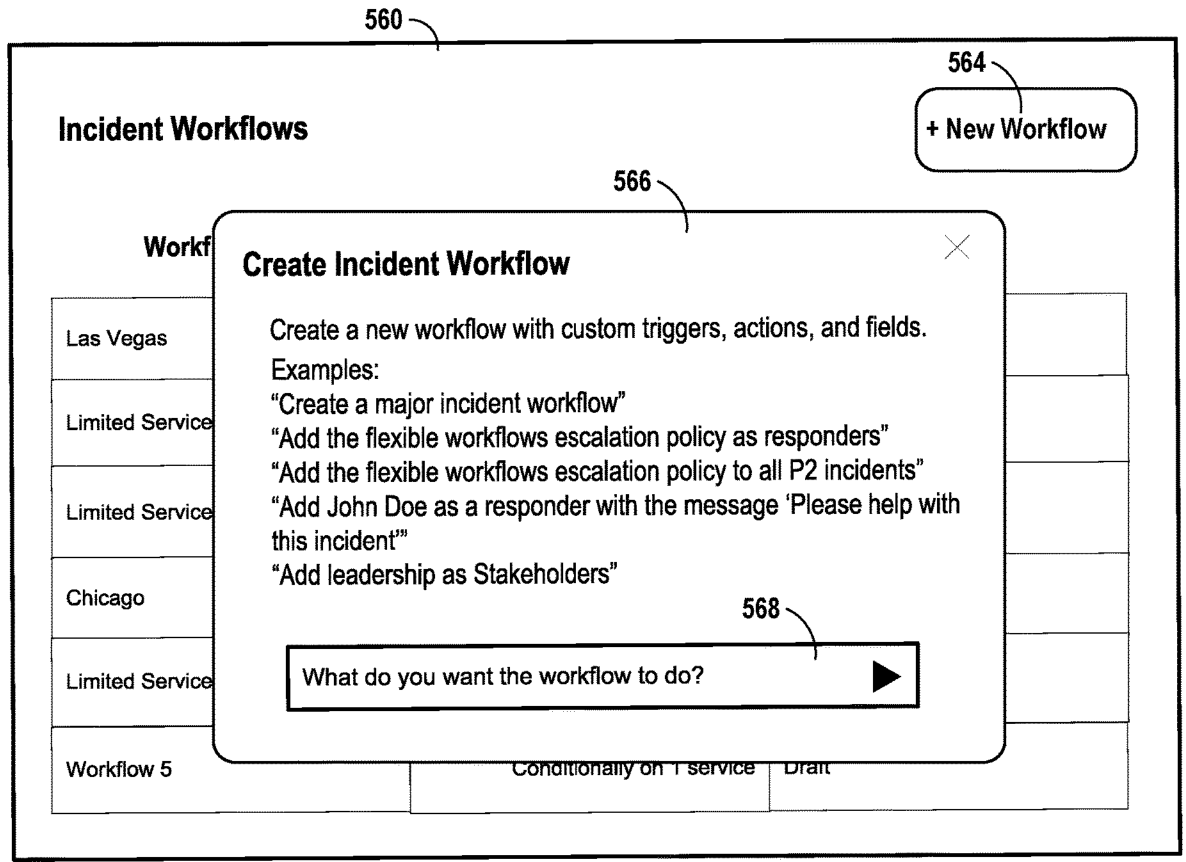

FIGS. 4A-4D are conceptual diagrams illustrating an example user interface sequence for incident workflow creation, in accordance with one or more aspects of the present disclosure. The example of FIG. 4A includes user interface 460, which may be a user interface generated by UI module 202 for display, e.g., on a user computing device in communication with operations computing system 210. As shown in the example of FIG. 4A, user interface 460 may be an "incident workflows" user interface that includes incident workflows table 462 and new workflow button 464. Incident workflows table 462 may display data pertaining to one or more workflows stored in incident data storage 224, such as workflow name (e.g., "workflow 5," "limited services 1," etc.), workflow triggers (e.g., one or more of a manual trigger, an automatic trigger, a scheduled trigger, an event-based trigger, etc.) and workflow status (e.g., published or draft). As described with respect to FIGS. 4B-4D, a user may interact with user interface 460, such as by clicking on new workflow button 464, to cause operations computing system 210 to generate data for displaying the natural language user interface described herein.

FIG. 4B includes user interface 560 and new workflow button 564, which may be examples of user interface 460 and new workflow button 464 of FIG. 4A. As described above, a user may interact with new workflow button 564 to cause the operations computing system to generate data for displaying natural language user interface 566 one or more user interface devices of a user computing device. As shown in the example of FIG. 4B, natural language user interface 566 may be configured to create an incident workflow for a user based on natural language text input provided to text entry field 568. As further shown in the example of FIG. 4B, in some examples, prior to receiving any natural language text input, natural language user interface 566 may display one or more recommended natural language text inputs, such as "Create a major incident workflow," "Add the flexible workflows escalation policy as responders," "Add the flexible workflows escalation policy to all P2 incidents," "Add John Doe as a responder with the message 'Please help with this incident'," and "Add leadership as Stakeholders." In some examples, as described above with respect to FIG. 2, the one or more recommended inputs may be based on incident data determined by one or more applications of applications 221, or in some examples, based on historical data 358 of FIG. 3, which may include historical natural language text inputs. As shown in the example of FIG. 4B, text entry field 568 may further include a text entry field prompt such as "What do you want the workflow to do?" in which a user may then enter an initial natural language text input into text entry field 568.

Figure 4C:
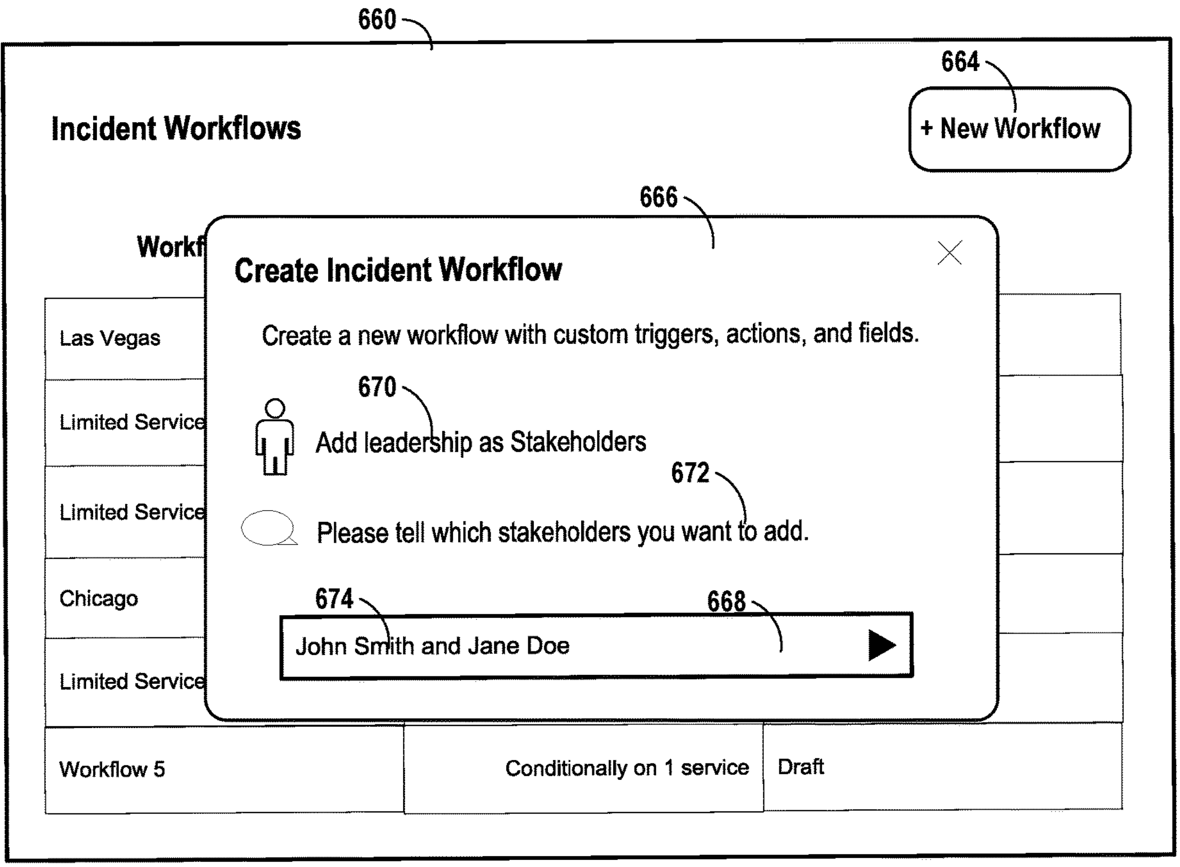

FIG. 4C includes user interface 660, new workflow button 664, natural language user interface 666, and text entry field 668, which may be examples of user interface 560, new workflow button 564, natural language user interface 566, and text entry field 568 of FIG. 4B. As shown in the example of FIG. 4C, a user may provide an initial natural language text input 670 such as "Add leadership as Stakeholders," in which initial natural language text input 670 may be displayed via natural language user interface 666. As described herein, operations computing system 210 may receive initial natural language text input 670 and identify a task of, for example, adding stakeholder. The operations computing system may then generate a prompt based on initial natural language text input 670, in which the prompt may be provided, e.g., using API module 252 of FIG. 2, to a machine learning model and instruct the model to facilitate a conversation for gathering data pertaining to the addition of stakeholders. As further shown in the example of FIG. 4C, text output 672, which may be generated by the machine learning model based on initial natural language text input 670 and sent from the operations computing system, may be displayed on natural language user interface 666, in which text output 672 includes one or more of a clarifying question and a clarifying instruction, such as "Please tell which stakeholders you want to add." As further shown in the example of FIG. 4C, the user may then provide, in text entry field 668, additional natural language text input 674 responsive to the clarifying question or clarifying instruction, such as "John Smith and Jane Doe." As described herein, the machine learning model may then use initial natural language text input 670 and additional natural language text input 674 to generate respective initial structured text data for a prompt that results in the creation of a portion of an incident workflow, e.g., data that includes relevant information for adding stakeholders. The operations computing system may then apply, using API module 252, the machine learning model to the respective initial structured text data (and in some examples, other respective initial structured text data generated based on other prompts for other tasks identified by the operations computing system) to generate updated structured text data including instructions for creating an incident workflow. The operations computing system may receive the updated structured text data including the instructions and create, based on the instructions, the incident workflow, which may be displayed on incident workflows user interface 460 of FIG. 4A.

Figure 4D:
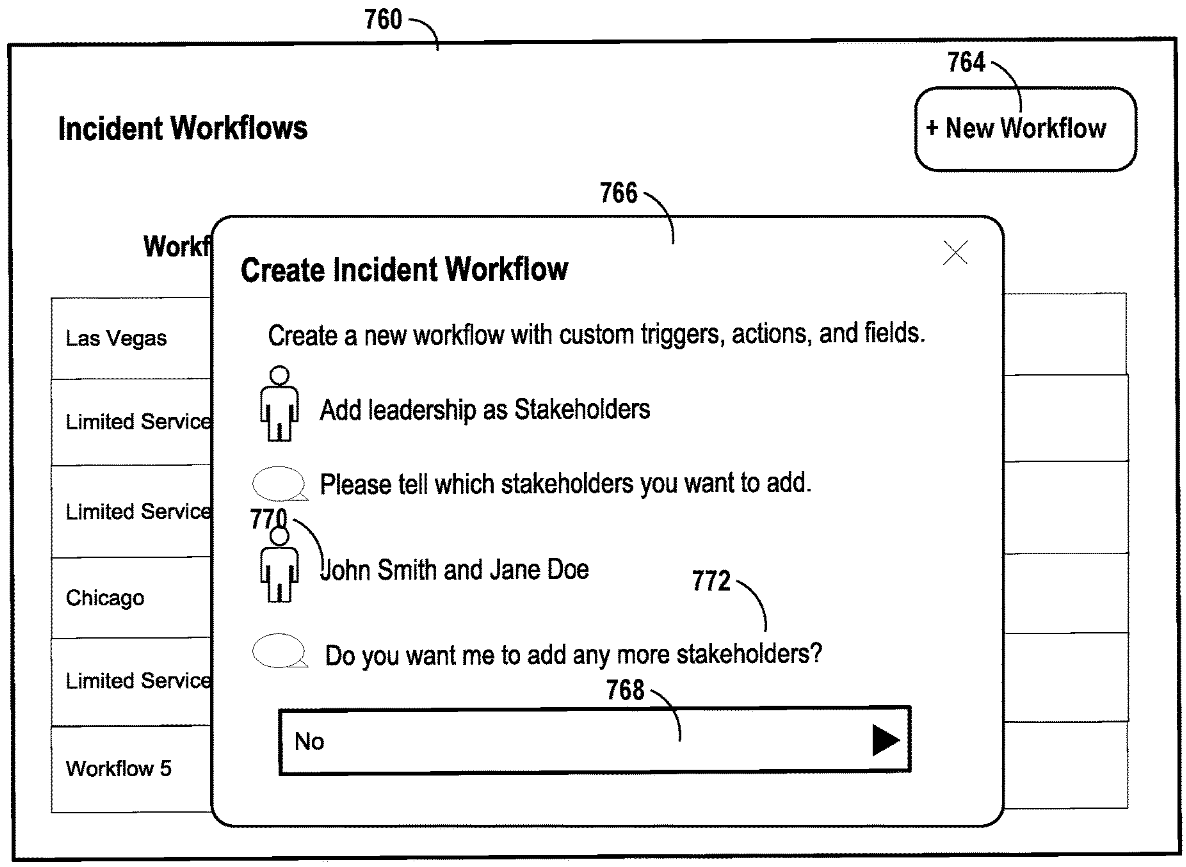

FIG. 4D includes user interface 760, new workflow button 764, natural language user interface 766, and text entry field 768, which may be examples of user interface 660, new workflow button 664, natural language user interface 666, and text entry field 668 of FIG. 4C. As shown in the example of FIG. 4D, text output 772 displayed on natural language user interface 766 includes the string, "Do you want me to add any more stakeholders?". As further shown in the example of FIG. 4D, the input provided to text entry field 768 includes the string, "No." As described with respect to FIG. 2, in some examples, natural language input and output may be exchanged between the operations computing device and the user computing device for each prompt until operations computing device 210 receives input indicating that a user has no further input to provide or that a user does not want to add any additional information. In the example of FIG. 4D, the operations computing system may send the input provided to text entry field 768 to the machine learning model in which the machine learning model may determine that the user is done providing input. The machine learning model may then output, to the operations computing system, the respective initial structured text data that includes all relevant information pertaining to the identified task, e.g., adding stakeholders, in which the operations computing system may combine and/or process all respective initial structured text data for each prompt received by the operations computing system. The operations computing system may then apply the machine learning model to the initial structured text data to generate updated structured text data, wherein the updated structured text data includes instructions for creating an incident workflow. Following the example demonstrated by FIGS. 4A-4D, the machine learning model may output updated structured data including instructions for creating an incident workflow, in which John Smith and Jane Doe are added as stakeholders.

Figure 5:
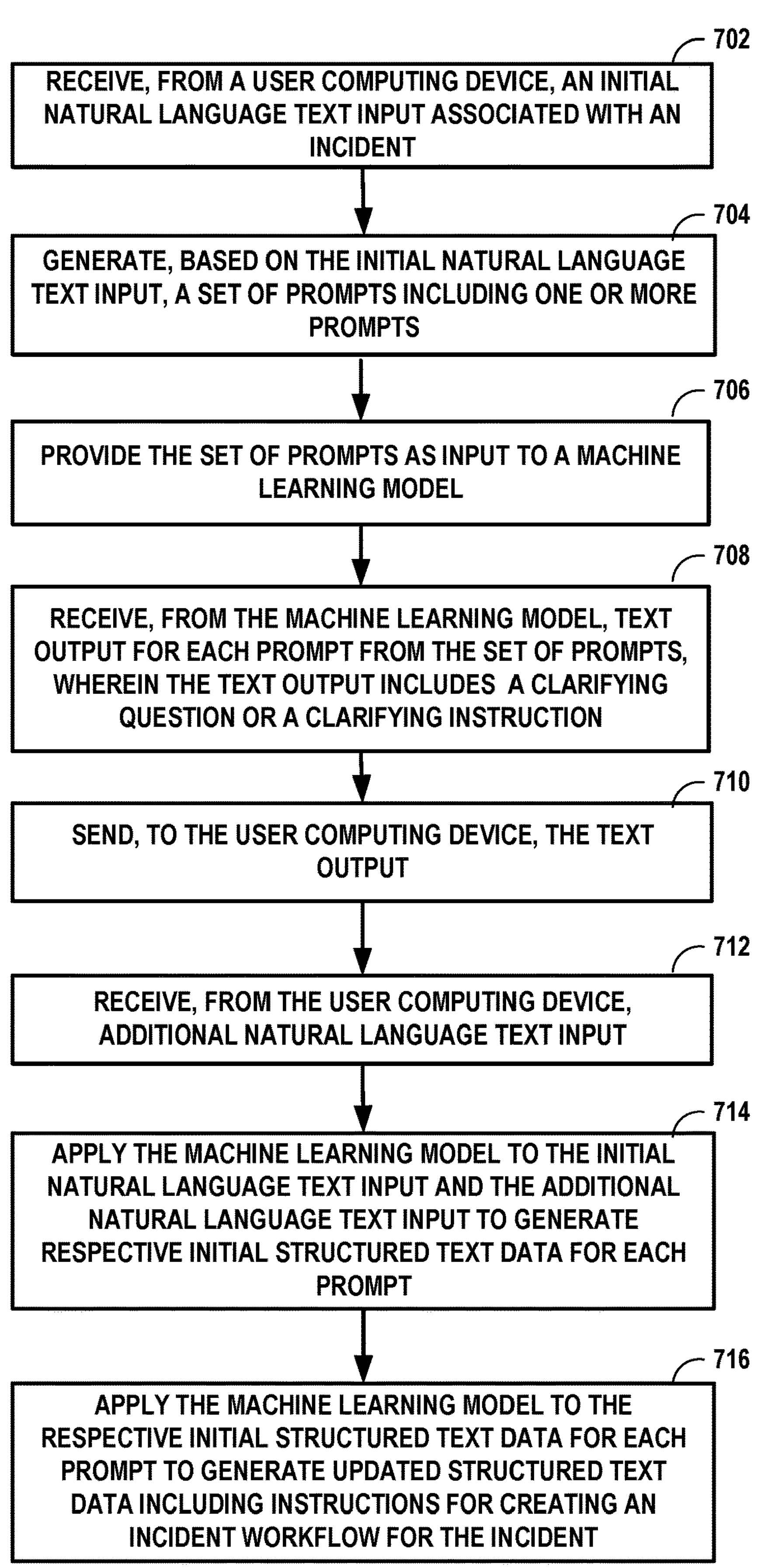
FIG. 5 is a flow chart illustrating an example process of generating natural language user interfaces for incident workflow creation, in accordance with one or more aspects of the present disclosure.

FIG. 5 is a flow chart illustrating an example process of generating natural language user interfaces for incident workflow creation, in accordance with one or more aspects of the present disclosure. FIG. 5 is discussed with respect to FIGS. 1-4 for example purposes only. Operations computing system 210 receives, from a computing system of computing systems 150, an initial natural language text input associated with an incident at a customer site of customer sites 140 (702). Operations computing system 210 generates, based on the initial natural language text input, a set of prompts including one or more prompts (704). API module 252 of operations computing system 210 provides the set of prompts as input to a machine learning model (706). API module 252 of operations computing system 210 receives, from the machine learning model, text output for each prompt from the set of prompts, in which the text output includes one or more of a clarifying question and a clarifying instruction (708). Operations computing system 210 sends, to the computing system of computing systems 150, the text output (710). Operations computing system 210 receives, from the computing system of computing systems 150, additional natural language text input (712). In some examples, the initial natural language text input and the additional natural language text input are indicative of data for the incident workflow. In some examples, UI module 202 of operations computing system 210 generates data for a user interface including the initial natural language text input, the additional natural language text input, and the text output. In some examples, operations computing system 210 determines, based on stored data, whether the initial natural language text input and the additional natural language text input is valid, in which the stored data includes one or more of valid user data, valid computing system data, and valid workflow parameters data. In some examples, the initial natural language text input and the additional natural language text input determined to be valid includes one or more of a trigger, an action, and a field for the incident workflow. In some examples, the trigger includes one or more of a manual trigger, an automatic trigger, a scheduled trigger, and an event-based trigger. In some examples, the action includes one or more of an addition of stakeholders, a sending of a status update, a creation of a message thread, a sending of a message thread link, an addition of responders, and a starting of a virtual meeting. In some examples, the field for the incident workflow includes one or more of an identifier, a title, a description, a timestamp, an incident type, an incident source, a severity level, one or more assigned users, an urgency level, a priority level, a current incident status, incident resolution data, one or more associated support tickets, and an action log.

Operations computing system 210 applies, using API module 252, the machine learning model to the initial natural language text input and the additional natural language text input to generate respective initial structured text data for each prompt from the set of prompts (714). Operations computing system 210 applies, using API module 252, the machine learning model to the respective initial structured text data for each prompt from the set of prompts to generate updated structured text data, in which the updated structured text data includes instructions for creating an incident workflow for the incident (716). In some examples, workflow engine 232 of operations computing system 210 receives the updated structured text data, and creates, based on the updated structured text data, the incident workflow, which may be stored in incident data storage 224. In some examples, computing system 210 further receives user input to further configure the data for the incident workflow.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term “or” may be interrupted as “and/or” where context does not dictate otherwise. Additionally, while phrases such as “one or more” or “at least one” or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms “processor” or “processing circuitry” as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

receiving, by a computing system, and from a user computing device, an initial natural language text input associated with an incident;

identifying, by the computing system, based on the initial natural language text input, one or more tasks;

generating, by the computing system and based on the initial natural language text input, a set of prompts including one or more prompts, wherein each respective prompt from the one or more prompts is associated with a respective task of the one or more tasks, wherein the respective prompt includes a description of the respective task, and wherein the respective prompt includes one or more additional instructions instructing a machine learning model to output a clarifying question or a clarifying instruction if the machine learning model does not have information associated with the respective task;

for each respective prompt from the one or more prompts:

providing, by the computing system, the respective prompt as input to the machine learning model;

receiving, by the computing system and from the machine learning model, a respective text output for the respective prompt, wherein the respective text output includes one or more of the clarifying question or the clarifying instruction;

sending, by the computing system and to the user computing device, the respective text output;

receiving, by the computing system, and from the user computing device, a respective additional natural language text input for the respective prompt;

providing, by the computing system, the initial natural language text input and the respective additional natural language text input for the respective prompt as input to the machine learning model; and obtaining, by the computing system, respective initial structured text data for the respective prompt from the machine learning model;

providing, by the computing system, all respective initial structured text data for the one or more prompts as input to the machine learning model; and obtaining, by the computing system, updated structured text data for the one or more prompts from the machine learning model, wherein the updated structured text data for the one or more prompts includes instructions for creating an incident workflow for the incident.

2. The method of claim 1, further comprising:

receiving, by the computing system, the updated structured text data for the one or more prompts; and creating, by the computing system, and based on the updated structured text data for the one or more prompts, the incident workflow.

3. The method of claim 1, further comprising, generating, by the computing system, data for a user interface including the initial natural language text input, the respective additional natural language text input, and the respective text output.

4. The method of claim 1, wherein the initial natural language text input and the respective additional natural language text input are indicative of data for the incident workflow.

5. The method of claim 1, further comprising:

determining, by the computing system and based on stored data, whether the initial natural language text input and the respective additional natural language text input are valid, wherein the stored data includes one or more of valid user data, valid computing system data, and valid workflow parameters data.

6. The method of claim 5, wherein the initial natural language text input and the respective additional natural language text input determined to be valid include one or more of a trigger, an action, and a field for the incident workflow.

7. The method of claim 5, wherein the initial natural language text input and the respective additional natural language text input determined to be valid include a trigger, and wherein the trigger includes one or more of a manual trigger, an automatic trigger, a scheduled trigger, and an event-based trigger.

8. The method of claim 5, wherein the initial natural language text input and the respective additional natural language text input determined to be valid include an action, and wherein the action includes one or more of an addition of stakeholders, a sending of a status update, a creation of a message thread, a sending of a message thread link, an addition of responders, and a starting of a virtual meeting.

9. The method of claim 5, wherein the initial natural language text input and the respective additional natural language text input determined to be valid include a field for the incident workflow, and wherein the field for the incident workflow includes one or more of an identifier, a title, a description, a timestamp, an incident type, an incident source, a severity level, one or more assigned users, an urgency level, a priority level, a current incident status, incident resolution data, one or more associated support tickets, and an action log.

10. The method of claim 1, further comprising:

receiving, by the computing system, user input as feedback data for the incident workflow.

11. A system comprising:

a memory; and one or more processors having access to the memory, wherein the one or more processors are configured to:

receive, from a user computing device, an initial natural language text input associated with an incident;

identify, based on the initial natural language text input, one or more tasks;

generate, based on the initial natural language text input, a set of prompts including one or more prompts, wherein each respective prompt from the one or more prompts is associated with a respective task of the one or more tasks, wherein the respective prompt includes a description of the respective task, and wherein the respective prompt includes one or more additional instructions instructing a machine learning model to output a clarifying question or a clarifying instruction if the machine learning model does not have information associated with the respective task;

for each respective prompt from the one or more prompts:

provide the respective prompt as input to the machine learning model;

receive, from the machine learning model, a respective text output for the respective prompt, wherein the respective text output includes one or more of the clarifying question or the clarifying instruction;

send, to the user computing device, the respective text output;

receive, from the user computing device, a respective additional natural language text input for the respective prompt;

provide the initial natural language text input and the respective additional natural language text input for the respective prompt as input to the machine learning model; and obtain respective initial structured text data for the respective prompt from the machine learning model;

provide all respective initial structured text data for the one or more prompts as input to the machine learning model; and obtain updated structured text data for the one or more prompts from the machine learning model, wherein the updated structured text data for the one or more prompts includes instructions for creating an incident workflow for the incident.

12. The system of claim 11, wherein the one or more processors are further configured to:

receive the updated structured text data for the one or more prompts; and create, based on the updated structured text data for the one or more prompts, the incident workflow.

13. The system of claim 11, wherein the one or more processors are further configured to generate data for a user interface including the initial natural language text input, the respective additional natural language text input, and the respective text output.

14. The system of claim 11, wherein the initial natural language text input and the respective additional natural language text input are indicative of data for the incident workflow.

15. The system of claim 11, wherein the one or more processors are further configured to:

determine, based on stored data, whether the initial natural language text input and the respective additional natural language text input are valid, wherein the stored data includes one or more of valid user data, valid computing system data, and valid workflow parameters data.

16. The system of claim 15, wherein the initial natural language text input and the respective additional natural language text input determined to be valid include one or more of a trigger, an action, and a field for the incident workflow, wherein the trigger includes one or more of a manual trigger, an automatic trigger, a scheduled trigger, and an event-based trigger, wherein the action includes one or more of an addition of stakeholders, a sending of a status update, a creation of a message thread, a sending of a message thread link, an addition of responders, and a starting of a virtual meeting, and wherein the field for the incident workflow includes one or more of an identifier, a title, a description, a timestamp, an incident type, an incident source, a severity level, one or more assigned users, an urgency level, a priority level, a current incident status, incident resolution data, one or more associated support tickets, and an action log.

17. A non-transitory computer-readable storage medium encoded with instructions that, when executed, cause at least one processor of a computing system to:

receive, from a user computing device, an initial natural language text input associated with an incident;

identify, based on the initial natural language text input, one or more tasks;

generate, based on the initial natural language text input, a set of prompts including one or more prompts, wherein each respective prompt from the one or more prompts is associated with a respective task of the one or more tasks, wherein the respective prompt includes a description of the respective task, and wherein the respective prompt includes one or more additional instructions instructing a machine learning model to output a clarifying question or a clarifying instruction if the machine learning model does not have information associated with the respective task;

for each respective prompt from the one or more prompts:

provide the respective prompt as input to the machine learning model;

receive, from the machine learning model, a respective text output for the respective prompt, wherein the respective text output includes one or more of the clarifying question or the clarifying instruction;

send, to the user computing device, the respective text output;

receive, from the user computing device, a respective additional natural language text input for the respective prompt;

provide the initial natural language text input and the respective additional natural language text input for the respective prompt as input to the machine learning model; and obtain respective initial structured text data for the respective prompt from the machine learning model;

provide all respective initial structured text data for the one or more prompts as input to the machine learning model;

obtain updated structured text data for the one or more prompts from the machine learning model, wherein the updated structured text data for the one or more prompts includes instructions for creating an incident workflow for the incident;

receive the updated structured text data for the one or more prompts; and create, based on the updated structured text data for the one or more prompts, the incident workflow.

18. The non-transitory computer-readable storage medium of claim 17, wherein the instructions further cause the at least one processor to generate data for a user interface including the initial natural language text input, the respective additional natural language text input, and the respective text output.

19. The non-transitory computer-readable storage medium of claim 17, wherein the initial natural language text input and the respective additional natural language text input are indicative of data for the incident workflow, and wherein the instructions further cause the at least one processor:

determine, based on stored data, whether the initial natural language text input and the respective additional natural language text input are valid, wherein the stored data includes one or more of valid user data, valid computing system data, and valid workflow parameters data.

20. The non-transitory computer-readable storage medium of claim 19, wherein the initial natural language text input and the respective additional natural language text input determined to be valid include one or more of a trigger, an action, and a field for the incident workflow, wherein the trigger includes one or more of a manual trigger, an automatic trigger, a scheduled trigger, and an event-based trigger, wherein the action includes one or more of an addition of stakeholders, a sending of a status update, a creation of a message thread, a sending of a message thread link, an addition of responders, and a starting of a virtual meeting, and wherein the field for the incident workflow includes one or more of an identifier, a title, a description, a timestamp, an incident type, an incident source, a severity level, one or more assigned users, an urgency level, a priority level, a current incident status, incident resolution data, one or more associated support tickets, and an action log.

* * * * *